Figure 1:
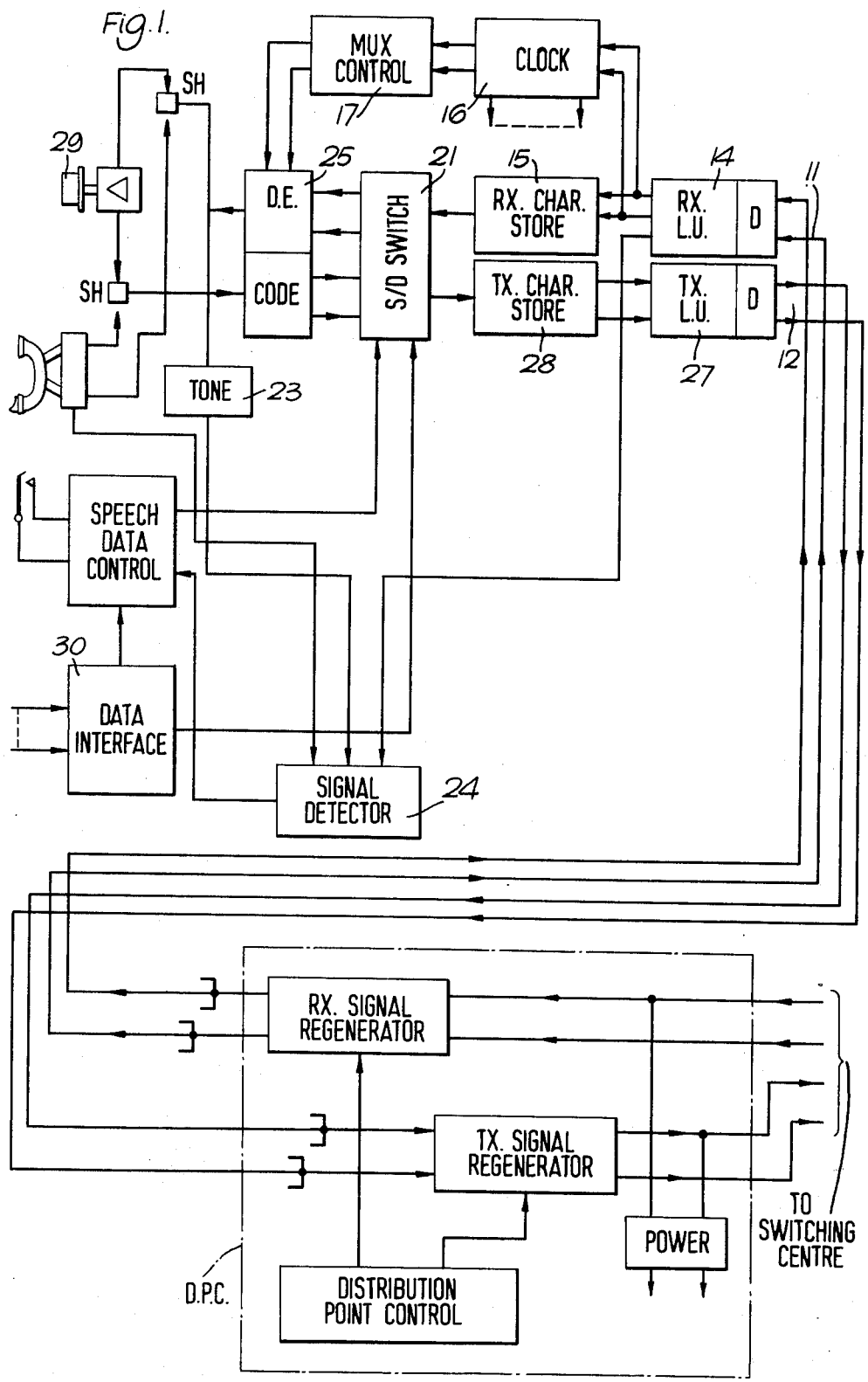

United States Patent [19]

Weir

[11] 4,070,551

[45] Jan. 24, 1978

[54] LOCAL CALL COMPLETION FOR TIME DIVISION MULTIPLEXING SYSTEM

[75] Inventor: Donald Adams Weir, Cheshunt, England

[73] Assignee: International Standard Electric Corporation, New York, N.Y.

[21] Appl. No.: 726,727

[22] Filed: Sept. 27, 1976

[30] Foreign Application Priority Data

Oct. 2, 1975 United Kingdom ............... 40310/75

[51] Int. Cl.² .......................... H04J 3/00; H04M 3/02; H04Q 3/60
[52] U.S. Cl. .......................... 179/18 FC; 179/15 AT; 179/18 J
[58] Field of Search ............. 179/18 FC, 18 D, 15 A, 179/15 AT, 18 J

[56] References Cited

U.S. PATENT DOCUMENTS

| | | | |
|---|---|---|---|
| 3,319,008 | 5/1967 | Kneisel et al. | 179/15 AT |
| 3,456,082 | 7/1969 | Brown | 179/18 J |
| 3,462,557 | 8/1969 | Brooks et al. | 179/18 FC |
| 3,778,555 | 12/1973 | Nordling et al. | 179/18 FC |
| 3,796,835 | 3/1974 | Closs et al. | 179/15 A |

*Primary Examiner*—Thomas A. Robinson
*Attorney, Agent, or Firm*—James B. Raden; Marvin M. Chaban

[57] ABSTRACT

Apparatus within a time division multiplex telecommunications system for terminating local traffic at a local distributing center and eliminating the need for use of channels to the switching center. The system employs time slots for calls to the switching center and other time slots for local calls. Digits representing the called line are stored in a register at the calling station. The register is interrogated after sufficient digits have been stored to inidicate the destination as local or switching center. When a local call is recognized, a bistable in the local distributing center is set. When the end of dialing signal is received, a code is generated to release the channel connection to the main exchange and to complete the call locally over time slots dedicated to serving local calls.

4 Claims, 2 Drawing Figures

LOCAL CALL COMPLETION FOR TIME DIVISION MULTIPLEXING SYSTEM

The present invention relates to an automatic telecommunication switching system in which communication connections are set up using time-division multiplex (TDM) techniques.

The system to be described herein is similar in many respects to that described in British application No. 929/75, filed jointly by the present applicant and D. E. Peugh, in which calls use TDM techniques so far as the subscribers' terminals. In such a system, especially when serving a rural area, there may be a substantial amount of purely local traffic, and an object of the present invention is to provide improved operation in such a case.

According to the present invention, there is provided an automatic telecommunication switching system, which includes a switching centre to which are connected TDM highways each of which serves a number of subscribers' lines, in which at least one of said highways is connected to a distribution circuit which is physically connected to the terminals of the subscribers' lines served by the system, in which the TDM circuits used in respect of said physical connections between a said distribution circuit and said line terminals provide time slots usable for connections which are set up via the switching centre and further time slots which are usable for connections which are set up via a said distribution circuit but not via the switching centre, and in which a call between two of the subscribers' terminals which are connected to the same said distribution circuit can be set up using one of said further time slots, in which case the connection as set up does not extend via the switching centre.

In the system described herein when a connection is to be set up, a free time slot usable for connections set up via the switching centre is initially seized for the subscriber who initiates that call. However, control circuitry associated with the caller's terminal checks the number before it is sent out, and if it is a number of another subscriber connected to the same distribution circuit, the originally seized time slot is dropped and a new one in the local multiplex seized for the cell. This, at the relatively small cost of providing extra time slots in the local distribution network, enables the work load of the switching centre to be reduced since the local traffic no longer needs the services of the switching centre. Metering is attended to by the transmission of metering information relating to a local call to the switching centre after the call has ended.

In addition to the advantage referred to above, the system described herein has the further advantage that where the switching centre, or the connections therefrom to the distribution circuits, fail, emergency communication is possible on a local basis.

Figure 2:
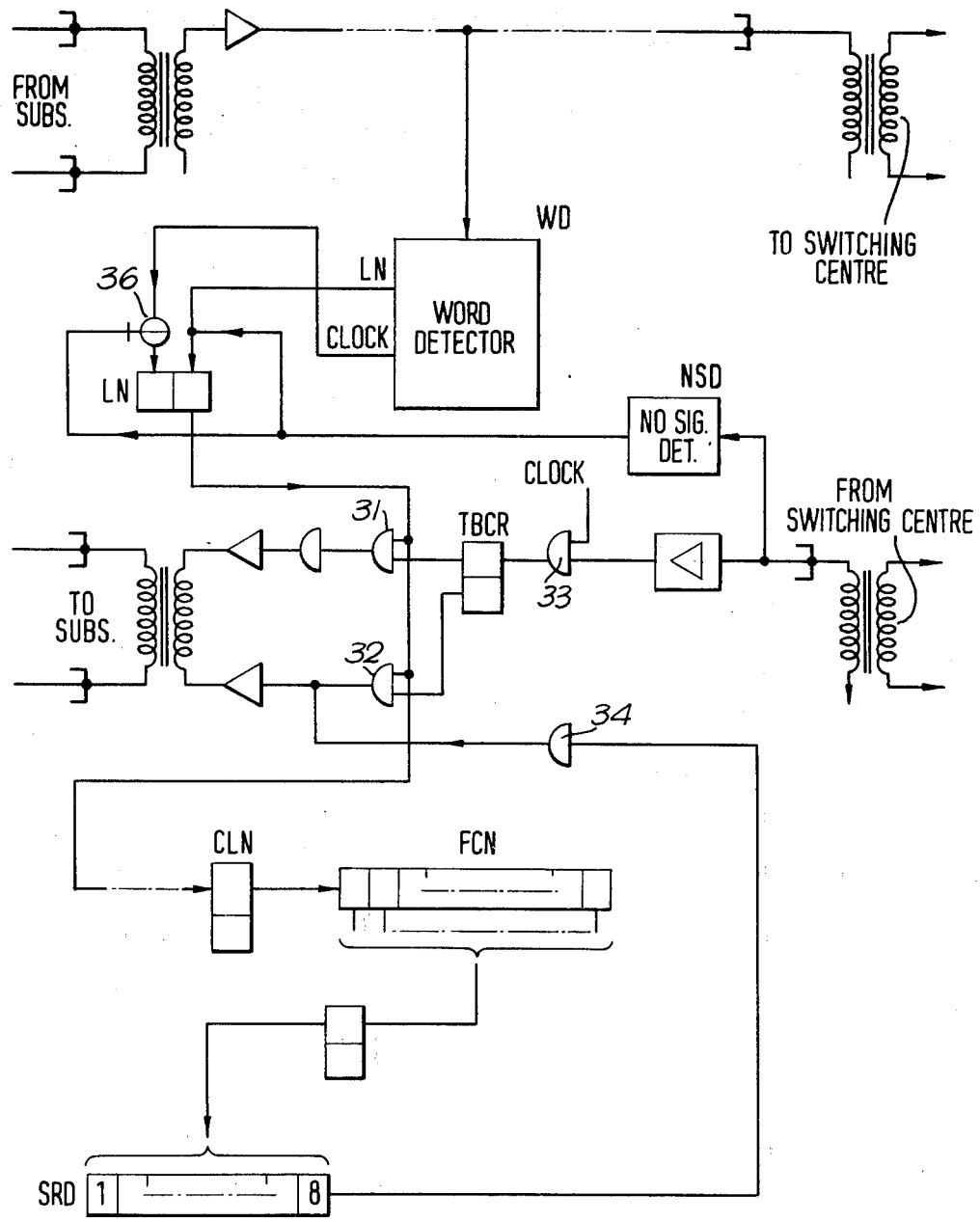

An embodiment of the invention will now be described with reference to the accompanying drawings, in which FIG. 1 is a highly simplified block schematic of a system embodying the invention, and FIG. 2 is a partial circuit diagram explanatory of the invention.

The subscriber's terminal shown in FIG. 1 is in many respects as described in the above-mentioned patent application, and the system operation, at least for connections set up via the switching centre is as in that application. A number of TDM highways are connected to the switching centre (not shown), and of these some at least are connected to a distribution point circuit DPC, from which connections extend to the subscribers' terminals, one of which is shown. As shown, the circuit DPC is connected to the switching centre by one "four-wire" TDM highway, but in some cases the DPC-switching centre connection may need two or more such TDM highways. These connections to subscribers' lines are indicated by the multiplying symbols associated with the receiving and transmitting highways 11 and 12. Note that the system as described is of the so-called four-wire type, i.e., it has separate physical paths for the two directions, although the invention is also applicable to two-wire systems. Other highways from the switching centre may extend direct to a subscriber's terminal if that terminal has sufficient traffic to warrant such a provision. This condition may apply, for instance, where a terminal is a concentrator. The main elements of the circuit DPC are the receiving and transmitting signal regenerators, and a control circuit, which will be described later with reference to FIG. 2. The regenerators are needed when the distance from the circuit DPC to the switching centre is of the order of kilometers.

The sampling rate is the one usually used at present, i.e., 8KHz, and the intelligence is conveyed as 8-bit PCM codes each of which is sent serially. To provide the two sets of time slots, one set for calls set up via the switching centre and the other set for local calls, alternate time slots are reserved for "switching centre calls" and for local calls. In the system described, there are 32 time slots in the cycle, 16 for local calls and 16 for switching centre calls. This should be compared with the system described in the above-mentioned application, in which there are 16 time slots in the cycle. Other proportions between these two sorts of call could be used: thus one could provide, assuming a 32-slot multiplex, 28 slots for calls set up via the switching centre with four slots for calls set up locally. In such a case it would be possible for the last-named four slots to be normally unavailable, but to be brought into use when failures prevent the switching centre from performing its normal function. In any case it is preferable for the number of time slots in one of the two groups thereof to be an integral multiple of the number of time slots in the other group.

I now consider the subscriber's terminal shown in the upper portion of FIG. 1 in more detail. It is connected to the distribution point circuit DPC via the two pairs 11 and 12, since the system is a four-wire one. The terminal is synchronized by the bit stream which reaches it via the incoming pair 11 which is connected to the receiving line unit 14. This unit extracts the intelligence from the line unit, and in it, the dipulse signals (each being $+-$ or $-+$) are transformer-coupled to a squarer from which the binary content is extracted by a bistable whose output is connected to a receive character store 15. The line unit also has its output connected to a clock extraction circuit 16, which derives the local clock signals with synchronisation effected as in the above-mentioned application, i.e., each multiplex frame or cycle starts with a double-amplitude pulse which in effect "tells" the terminal when the frame commences.

The terminal is one of a group connected TDM-wise to the switching centre by one "four-wire" highway, so the clock 16 includes two pulse sources one running at the line bit rate (or a multiple thereof) while the other runs at the pulsing rate for the channel in use. These outputs feed, inter alia, a multiplex control circuit 17. This includes a counter driven at a rate appropriate to define the tie slots in the frame used by the terminals sharing the same highway pair. This counter and its associated circuitry receives a marking appropriate to the TDM channel in use for the terminal, so that it generates in each frame an output at that time slot.

The tone circuit 23 generates ringing signals and the various tones needed at the terminal in response to signals which it receives via a signal detector 24. Tone generation is based on a square-wave generator driven from the clock, with pulse division to produce the desired frequencies, and control circuits to produce the appropriate cadences.

The operation of the system for a normal call set up via the switching centre will now be described briefly. When the subscriber lifts the handset, the switch hook contacts SH isolate the tone caller 29 and set the speech-/data switch 21 to its speech condition. This connects the output of the coder part of the codec 25 to the line. The closure of SH also causes "dial" tone to be supplied from the tone circuit 23, and this tone persists until after the caller has keyed in the wanted number and has also depressed an end-of-selection key EOSK (not shown), so that the caller is reminded that this key must be depressed.

As in the above application, the normal condition is that a free time slot of those used for calls via the switching centre is used for signalling and is available to any caller. This free channel, which can be allotted at the exchange, is marked by the exchange with a special PCM code called USB, to identify if as the signalling channel. The quiescent subscriber's terminals set themselves to this channel, each terminal so setting itself that a terminal set in its hunt for the marked channel finds the USB-marked channel. When this occurs the detector 24 responds to the signal USB to set the MUX control 17 to this channel, so that on every occurrence thereof it is offered to the terminal. When a call is initiated, the marked channel is seized, and a signal indicating that this seizure has taken place, is sent to the switching centre, which transfers the USB signal to another free channel (if there is one). If there are no free channels, the detection of this condition by the detector 24 lights a lamp at the terminals to indicate to them that there is no free channel.

To revert to the operations at the erminal when a subscriber initiates a call, when he lifts his handset, the speech data switch 21 goes to the speech condition, as mentioned above, which connects the codec output to the line, and also generates reset signals for the various parts of the terminal. In response to the "dial" tone, the caller operates his digit sender, which in a "fully electronic" system such as that described herein, would normally be a push-button set. Each "dialled" digit is marked into a multi-digit shift register, and after the last digit is "dialled" the caller operates an EOS (end of selection) key. As mentioned above, it is only when this key is operated that dial tone is removed. After the last dialled digit, the operation of the EOS key causes a special EOS code to be placed in the shift register, followed by the code corresponding to the caller's line. At the same time another special signal USA is placed in a second shift register and sent to the DPC and switching centre at each repetition of the time slot seized by the terminal.

Two types of call are considered, one which involves the switching centre and one which is local to local.

When the switching centre is ready to handle the call, it sends a signal, in this case the USA signal, to the terminal at the time slot seized thereby and this arrives at the receive line unit 14. All signals incoming to this unit 14 are monitored by the signal detector 24, and when this detects the reception of USA, the transmission of USA to the switching centre — via the transmit line unit 27, is terminated. The called number is now sent from the terminal via the transmit character store 28 from which it passes via the line unit 27 to the transmit highway. The intelligence sent consists of the wanted number, followed by the EOS code, followed in turn by two digits identifying the calling line within his group of 64 served by the circuit DPC and the highway pair to the switching centre.

At the switching centre the processor collects and assembles the data, and sets up a connection to the wanted line, which occurs as described in the abovementioned Application. When the connection has been set up, or the processor "decides" that it cannot be set up, it signals to the caller's terminal appropriately so that the ringing tone, busy tone or NU tone, as required, is generated. The signal detector 24 in response to such signals causes the tone circuit 23 to generate the appropriate tones. At the same time, if the call can be set up the switching centre signals the wanted line to cause the generation of a ringing signal thereat. This signal passes via the receive line unit 14 to the receive character store 15, and is detected by the signal detector 24. The latter causes the tone circuit 23 to apply a ringing signal via an amplier to a tone caller 29.

When the called subscriber replies, the off-hooking causes an answer signal to be produced, which is sent to the switching centre, the communication between the switching centre and the wanted line taking place using the time slot already seized by the caller. This answer signal removes the ringing and at the switching centre causes the connection between the two subscribers to be completed. The call completion removes the ringing signal, so the tone circuit 23 at the caller's terminal is now disabled.

To consider the called subscriber's end in more detail, it will be recalled that all terminals are in bit/frame synchronization with the switching centre. To call a terminal, the processor at the switching centre sends the called number at the time slot in use for signalling, and at the called terminal the signal detector 24 detects that the call is for its own line number. This causes the terminal to be connected to that slot, with transmission of the USA signal to the switching centre. The reception of this signal from the called terminal causes the ringing signal to be sent to the called terminal — and also the ringing tone signal to be sent to the calling terminal. When the called subscriber replies, signal USA is sent to the centre, and when the latter detects this signal from the unwanted terminal it sends thereto an answer signal, in response to which the connection is completed at the called terminal.

If, during a call, either subscriber wishes to convey data, he operates a Data key, which changes over the speech/data switch 21 so that it connects a data interface 30 to the transmit character store 28 instead of the speech equipment. The response to the Data key operation is to set a bistable from its speech state, to which it is set on call initiation, to its data state. To revert to speech, either party re-operates the Data key, which resets the bistable. Hence the Data key could be called a "change" key. Each operation of this key causes a data code to be sent fro the end at the key operation occurs to set the other end to the condition required.

To end the call, one of the parties to the call sets his Data key to its speech state, if not already in that state, and hangs up. This causes the production of a clear signal, which is sent to the switching centre, which thereupon breaks down the concentration.

At this point a few comments on the techniques used are worth-while. The code detection, as in the system of the above-mentioned application, is based on a rapid scan in which a received code is compared successively with all codes for which detection is needed, the scan continuing as long as discrepancy is noted. When the scan reaches a code identical with the received code, a bistable individual to the code in question is set and the scan is stopped. Certain of the signals used are validated by counting the number of times which they occur successively. Thus USA is accepted as valid if it occurs in 8 successive time slots: this reduces, and in practice eliminates, the risk of signal simulation by data or speech.

LOCAL-TO-LOCAL CALL

I now consider the operation for a local-to-local call, which takes place as described above until the caller starts to send the wanted number. The information in the multi-digit shift register mentioned above is interrogated by a word distributor in the terminal, and this includes a sequence control circuit which causes the wanted number digits to be tested as they enter the shift register. If they define a local subscriber, i.e., one whose terminal is connected to the same distribution point circuit DPC as the caller, a local number bistable is set to its 1 state. This detection should take place before the "dialling" is complete, since the digits prior to those which define the line within its group of 64—indicate whether the call is local or not.

When the local call bistable is set to its 1 condition as mentioned above, the call is placed under the control of the caller's terminal. The order of the digits of the intelligence in the long shift register is now altered so that the called line's number, i.e., the two digits which define him within the block of lines connected to the same DPC, now precede the EOS code. The EOS code is also changed, via gating responsive to the detection that the call is a local call, to a different EOS code, to indicate that a local number has been keyed.

The detection of the altered EOS code causes the PCM codes to be sent only as far as the circuit DPC and not to the switching centre, so the delay circuits D at the two line units are inserted into the circuit to compensate for the shorter lines. At the same time a relay (either mechanical or electronic) in the transmit line unit is operated so that the output transformer thereof is effective to send codes to the other subscribers connected to the same DPC, and not to the switching centre. Switching of a similar nature takes place at the receive side.

In normal operation, i.e., when calls are set up via the switching centre, the distribution point circuit acts solely as a signal regenerator for each direction of transmission, with power extracted from the two highways over which it is conveyed phantom-wise. The same method of power supply is also used for the terminals.

I now therefore describe the operations of the control circuitry of the DPC, with reference to the highly simplified circuit of FIG. 2, which only shows such of the circuit elements as are specific to the present invention.

When the EOS code plus two digits is sent, i.e., a local call, the detection that the wanted number relates to a local subscriber plus the end of selection code EOS activates the LN output of the word distribution WD. This sets the LN bistable so that it closes the gates 31 and 32 to cut off the supply of signals from the switching centre. This occurs at the output side of a bistable TBCR, whose input is clock-pulse controlled via gate 33: hence the cut off is a timed cut off and only occurs at the time position for the particular call being considered. That is, any existing calls which have been set up or are being set up via the switching centre are unaffected. Since this cut-off removes the signal USB, which would normally still be present in the data stream from the switching centre, a search now commences for a free channel in the local call time slots.

When the bistable LN operated as described above it also set a further bistable CLN whose output causes this search by starting a counter FCN, which acts as a free channel marker. This counter runs at the time slot rate for local call slots until a free slot is found, at which time the counter FCN stops and sets a further bistable which when set marks the code USB into a shift register SRD. This shift register now repeatedly emits the code USB once at each occurrence of the newly seized local call slot, and this code is sent at this time slot via gate 34 to the lines of the group which include the caller. Free subscribers' terminals, including the calling terminal, search for and lock to the new channel. When the calling line has thus become locked on to the local call time slot, the circuit in which the call data is stored repeatedly sends EOS plus the two digits of the wanted number which indentify it in its local group. This repeated transmission continues until the wanted subscriber replies. The reception at the wanted subscriber's terminal of his two "local" digits is arranged, when it occurs via a local call time slot, to generate a ringing signal to be emitted via the tone caller A counter associated with the digit sending means referred to above counts the number of sendings of the EOS-local digit combination, and when the count has reached a pre-set number, it assumes that the wanted line is busy because no response has been received. This cuts off digit sending and causes busy tone to be sent to the caller.

If the wanted subscriber's line is free, it causes USA to be sent at the time slot at which the line's terminal detected its own number. This signal USA is sent in this case to the calling subscriber's terminal where it cuts off the digit sending and causes the clling subscriber to receive ringing tone. At the same time a ringing signal is generated at the wanted terminal. When the wanted subscriber off-hooks, the answer signal sent in response thereto cuts off ringing tone and the ringing signal, and conversion can take place.

When the conversation ends, hanging up by one of the subscribers generates a clear signal, and this sets a bistable (not shown) at the calling terminal to cause metering. This is effected, as already mentioned, by the transmission at any suitable time of a message to the switching centre to the effect that the calling subscriber has completed a local call. In the present system such a local call is metered as if it were a unit-free call; however, if metering on a timed basis is needed for such local calls, this can be readily provided. The clear signal also resets the bistable LN to its rest condition, as a result of which the distribution point control circuitry reverts to its rest condition. The calling terminal now hunts in the usual manner for an initial signalling time slot from among those used for calls via the switching centre.

It will be appreciated that the use of a multiplex of $n$ channels to the exchange and another $n$ channels devoted entirely to local-to-local calls permits the total traffic to be much greater than if only the $n$ channels had been provided. Other multiples of $n$, of course, might be used if the local-to-local traffic proved to be much greater than the non-local traffic. It will also be appreciated that the two types of traffic can be handled quite independently.

If a failure occurs at the switching centre, or in the multiplex highway between the switching centre and a distribution point, this condition is indicated by the fact that no signals reach that point. This is detected by a no-signal detector NSD, which gives an output if signals disappear from the multiplex highway for a pre-set period, e.g., for 5 frames of the TDM system. If this occurs the output from NSD sets the bistable LN to its local call condition, and also via gate 36 disables the resetting input of LN. Hence until the fault is cleared and signals re-appear on the multiplex highway from the switching centre, the group of terminals, plus DPC, functions independently for local calls only. Under such fault conditions it is assumed that the local calls are not charged; this could, of course, be accomplished if a store of the local calls per calling subscriber were provided.

It is to be understood that the foregoing description of specific examples of this invention is made by way of example only and is not to be considered as a limitation on its scope.

I claim:

1. An automatic telecommunications switching system comprising a switching center, a plurality of subscriber lines coupled to said center over a plurality of time division multiplexed highways with each of said highways coupled to a plurality of subscriber lines to provide call service to said lines, a distribution circuit coupled to one of said highways intermediately between the subscriber lines served by said highway and the switching center for serving a plurality of subscriber lines over said highway, each time frame of the time multiplex of said one highway being divided into a first group of time slots for connection from a subscriber line seeking a call connection through a selected idle one of said time slots through said switching center and a second group of slots for local call connections between two or more subscriber lines served by said distribution circuit, and means in said distribution circuit responsive to recognition of a call as being directed to a subscriber line served by said distribution circuit for switching said local call to a selected idle one of said second group of slots independently of the switching center.

2. A system as claimed in claim 1, in which the last mentioned means in said distribution circuit comprises means for identifying dialed digits representing a called one of said subscriber lines, bistable means settable to one condition responsive to the identification of dialed digits as representing a called subscriber line as a line coupled to said distribution circuit to complete the call using said second group of time slots.

3. A system as claimed in claim 2, wherein there is means in said distribution circuit responsive to the absence of signals representing idle time slots in said first group for setting said bistable means to said second group of time slots.

4. A system as claimed in claim 2, wherein there is time slot selecting means in said distribution circuit responsive to the setting of said bi-stable means to said one condition for seizing a selected time slot, and a shift register responsive to said seizure for causing busying of the selected time slot.

* * * * *